United States Patent
Gupta et al.

(10) Patent No.: US 6,889,066 B2
(45) Date of Patent: May 3, 2005

(54) NETWORK ECHO SUPPRESSION IN MOBILE STATIONS

(75) Inventors: Samir Gupta, San Diego, CA (US); Ivan K. Oei, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 220 days.

(21) Appl. No.: 09/819,109

(22) Filed: Mar. 27, 2001

(65) Prior Publication Data

US 2002/0142811 A1 Oct. 3, 2002

(51) Int. Cl.⁷ .................................................. H04M 1/00
(52) U.S. Cl. ................ 455/570; 379/406.1; 379/406.07
(58) Field of Search .............................. 455/570, 552, 455/553, 569; 379/406.01, 406.05, 406.07; 370/286, 288

(56) References Cited

U.S. PATENT DOCUMENTS

| | | | |
|---|---|---|---|
| 4,901,307 A | | 2/1990 | Gilhousen et al. |
| 5,103,459 A | | 4/1992 | Gilhousen et al. |
| 5,343,521 A | * | 8/1994 | Jullien et al. .......... 379/406.07 |
| 5,416,829 A | * | 5/1995 | Umemoto .................. 455/553 |
| 5,526,426 A | * | 6/1996 | McLaughlin ........... 379/406.13 |
| 5,764,753 A | * | 6/1998 | McCaslin et al. ...... 379/406.07 |
| 5,838,787 A | | 11/1998 | Ding et al. ................. 379/409 |
| 6,148,078 A | * | 11/2000 | Romesburg ............ 379/406.07 |
| 6,185,300 B1 | | 2/2001 | Romesburg ................ 379/410 |
| 6,249,581 B1 | * | 6/2001 | Kok ....................... 379/406.16 |
| 6,622,030 B1 | * | 9/2003 | Romesburg et al. ........ 455/570 |

* cited by examiner

Primary Examiner—Erika A. Gary
(74) Attorney, Agent, or Firm—Philip Wadsworth; Charles D. Brown; Kvong H. Macek (57) ABSTRACT

In one embodiment, a mobile station such as a dual-mode, AMPS and CDMA, handset communicates with an AMPS base station in a wireless communication system. The mobile station includes an acoustic echo canceller, which can detect acoustic echo, for example, feedback from the handset speaker to the handset microphone, during communication between the mobile station and the base station, and cancel or eliminate the acoustic echo. The mobile station also includes a network echo suppressor coupled to the acoustic echo canceller. For example, the network echo suppressor can read a parameter set by the acoustic echo canceller. The network echo suppressor attenuates or mutes a network echo caused by portions of the communication returning to the mobile station from the base station after a network propagation delay. Coupling the network echo suppressor to the acoustic echo canceller ensures proper interaction between the network echo suppressor and acoustic echo canceller.

30 Claims, 4 Drawing Sheets

NETWORK ECHO SUPPRESSION IN MOBILE STATIONS

BACKGROUND

1. Field

The present invention relates generally to the field of wireless communication systems, and more specifically to dual-mode communications, which support both analog and digital standards, such as CDMA.

2. Background

Digital wireless communication systems, such as code division multiple access ("CDMA") systems, typically have what is referred to as "dual-mode" capability. A dual-mode handset is a portable telephone handset that supports two types of services. It can switch from analog to digital or from cellular to satellite or from cellular to cordless. For example, a dual-mode handset, also referred to as a "mobile station" in the present application, can incorporate both CDMA and Advanced Mobile Phone Service ("AMPS") services. Dual-mode capability can be required, for example, for roaming which is the ability to use a communications device such as a cellphone or mobile station and be able to move from one cell or access point to another without losing the connection.

AMPS phone service belongs to "first generation" cellular technology. Digital systems, such as CDMA systems, belong to "second generation" digital technology. In CDMA systems each user uniquely encodes its communication signal into a transmission signal in order to separate its signal from those of other users. The encoding of the message signal spreads its spectrum so that the bandwidth of the encoded transmission signal is much greater than the original bandwidth of the message signal. For this reason CDMA systems are also referred to as "spread spectrum" systems. In digital systems each user communicates with other users through a base station, typically located in the center of each cell. It is possible for a user's communication signal to return to the user, after propagating through the communication network, in the form of a network echo, due to the network transmission delay in the propagation of the communication signal. The network echo can be disruptive to normal conversation. To counteract the effects of network echo, digital systems, such as CDMA systems, typically provide a mechanism in the base station to detect and attenuate network echo.

In a typical AMPS call, the network transmission delay is short enough that any network echo that finds its way back to the mobile station does not generally cause any problems. Thus, in general, no mechanism has been provided in AMPS base stations for detecting and attenuating network echo. In a digital FM call, where analog to digital conversion of the voice signal is used to enhance the quality of signal transmission, for example, using a vocoder and pulse code modulation, the network transmission delay is sufficiently large to cause a perceptible network echo, which can disrupt conversation.

In addition, the mobile station, which can use a handset, headset, or speakerphone to interface with the user, typically includes an acoustic echo canceller. The acoustic echo canceller counteracts feedback in the form of sound waves, i.e. acoustic feedback, from the speaker to the microphone in the mobile station. The network echo can have a disruptive effect on the performance of the acoustic echo canceller. For example, feedback interactions between the network echo and the acoustic echo canceller in the mobile station can lead to piercing tone generation referred to as "howl-ing". Attempting to provide a simple solution by blocking the second party's transmit path while the first party is talking and vice versa can disrupt the natural flow of conversation by, for example, preventing the second party from interrupting or responding to the first party while the first party continues to speak.

When roaming, the dual-mode mobile station can be in either mode. It is therefore necessary, for maximizing the user's convenience, to be able to provide the same features in either mode. For example, if a hands free speaker phone feature were to be provided in CDMA mode but not in AMPS mode due to the effects of network echo, the user could experience annoying difficulties in trying to use the hands free speaker phone feature while roaming.

Thus, there is a need in the art for detecting and attenuating network echo for first generation technology in dual-mode wireless communication systems. Moreover, there is a need in the art for detecting and attenuating network echo which interacts with acoustic echo cancellers present in dual-mode mobile stations.

SUMMARY

Embodiments disclosed herein address the above stated needs by providing detection and suppression of network echo for first generation technology in dual-mode wireless communication systems. Moreover, an embodiment provides for detecting and attenuating network echo in a manner which interacts with acoustic echo cancellers in dual-mode mobile stations.

In one aspect of the invention a mobile station includes a communication module configured to communicate with a base station in a wireless communication system. For example, the communication module can provide AMPS service in a dual-mode handset mobile station, which provides AMPS and CDMA communications, for communication with an AMPS base station in a wireless communication system. The mobile station includes an acoustic echo canceller, which can detect the presence of feedback through the acoustic environment, i.e. soundwaves in the air, for example, from the handset speaker to the handset microphone, during communication between the mobile station and the base station. The acoustic echo canceller operates to detect acoustic echo, i.e. the feedback through the acoustic environment, and cancel or eliminate it.

The mobile station also includes a network echo suppressor coupled to the acoustic echo canceller. For example, the network echo suppressor can read a parameter set by the acoustic echo canceller. The network echo suppressor attenuates or mutes a network echo generated during communication between the mobile station and the base station, for example, by portions of the communication returning to the mobile station after a network propagation delay. Moreover, the coupling of the network echo suppressor to the acoustic echo canceller ensures proper operation and interaction between the network echo suppressor and the acoustic echo canceller.

DETAILED DESCRIPTION

The presently disclosed embodiments are directed to network echo suppression in mobile stations. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art.

The drawings in the present application and their accompanying detailed description are directed to merely example embodiments of the invention. To maintain brevity, other embodiments of the invention which use the principles of the present invention are not specifically described in the present application and are not specifically illustrated by the present drawings. The word "exemplary" is used exclusively herein to mean "serving as an example, instance, or illustration." Any embodiment described herein as "exemplary" is not necessarily to be construed as preferred or advantageous over other embodiments.

Figure 1:
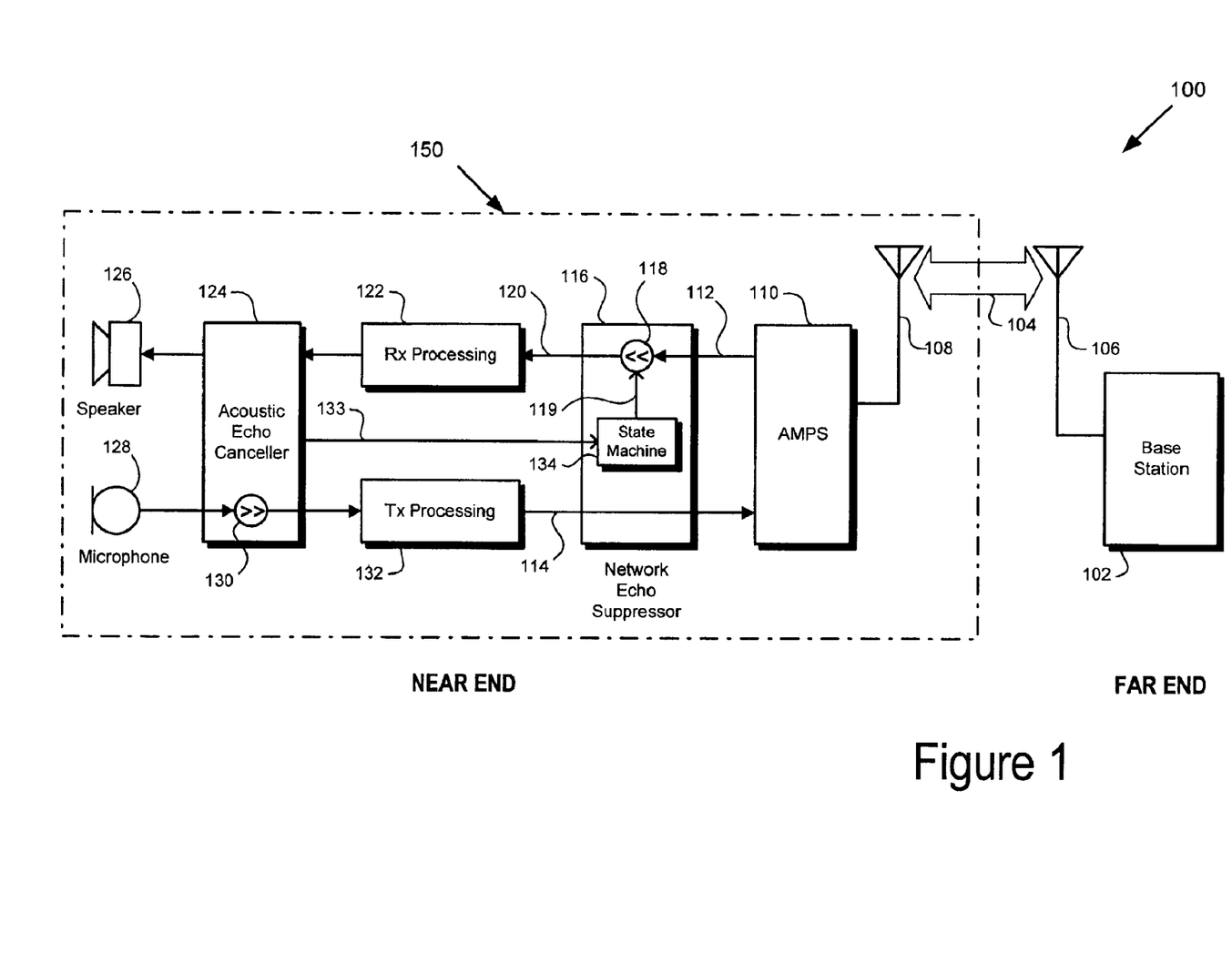
FIG. 1 is a block diagram illustrating an example of network echo suppression in accordance with one embodiment of the present invention in an exemplary wireless communication system.

Referring now to FIG. 1, an example of network echo suppression in an exemplary wireless communication system in accordance with one embodiment is illustrated. FIG. 1 shows exemplary system 100 including base station 102 and mobile station 150. As indicated in FIG. 1, the words "near end" are used to refer to mobile station 150 and various communication phenomena associated with mobile station 150, such as "near end voice activity" for example. Likewise, as indicated in FIG. 1, the words "far end" are used to refer to base station 102 and various communication phenomena associated with base station 102, such as "far end voice activity" for example. Far end may also be referred to as "network side" or "land side". Mobile station 150 can be a dual-mode handset, for example, and communicates with base station 102 over wireless communication channel 104. Communication channel 104 can be, for example, radio frequency transmission between transmit and receive antennas 106 and 108 in a wireless communication system providing dual-mode capability, such as CDMA and AMPS services.

The general principles of CDMA communication systems, and in particular the general principles for generation of spread spectrum signals for transmission over a communication channel is described in U.S. Pat. No. 4,901,307 entitled "Spread Spectrum Multiple Access Communication System Using Satellite or Terrestrial Repeaters" and assigned to the assignee of the present invention. The disclosure in that patent, i.e. U.S. Pat. No. 4,901,307, is hereby fully incorporated by reference into the present application. Moreover, U.S. Pat. No. 5,103,459 entitled "System and Method for Generating Signal Waveforms in a CDMA Cellular Telephone System" and assigned to the assignee of the present invention, discloses principles related to PN spreading, Walsh covering, and techniques to generate CDMA spread spectrum communication signals. The disclosure in that patent, i.e. U.S. Pat. No. 5,103,459, is also hereby fully incorporated by reference into the present application. Further, the present invention utilizes time multiplexing of data and various principles related to "high data rate" communication systems, and the present invention can be used in "high data rate" communication systems, such as that disclosed in U.S. patent application entitled "Method and Apparatus for High Rate Packet Data Transmission" Ser. No. 08/963,386 filed on Nov. 3, 1997, and assigned to the assignee of the present invention. The disclosure in that patent application is also hereby fully incorporated by reference into the present application.

Continuing with FIG. 1, mobile station 150 can be a dual-mode handset providing CDMA and AMPS services. Thus, mobile station 150 includes AMPS communication module 110 connected to transmit and receive antenna 108 for communication with base station 102. As seen in FIG. 1, mobile station 150 also includes network echo suppressor 116, receive processing module 122, acoustic echo canceller 124, speaker 126, microphone 128, and transmit processing module 132. AMPS communication module 110 provides communication from base station 102 in the form of receive signal 112. AMPS communication module 110 also communicates transmit signal 114 to provide communication from the user to base station 102. Receive signal 112 is fed to network echo suppressor 116 from AMPS communication module 110. Transmit signal 114 is fed to AMPS communication module 110 from network echo suppressor 116.

Continuing with FIG. 1, network echo suppressor 116 includes gain module 118 for adjusting the strength of receive signal 112. Thus, receive signal 112 is fed to gain module 118 and gain module 118 outputs adjusted receive signal 120, which is receive signal 112 adjusted by the gain of gain module 118. The gain of gain module 118, simply stated, is the ratio of the strength of the output signal to the strength of the input signal of gain module 118, which may be expressed, for example, in decibels ("dB"). Decibels are based on a logarithmic scale, thus for example, a gain of 0 dB represents unity (the output signal is the same strength as the input signal) and a negative dB gain represents an output signal which is weaker than the input signal. The gain of gain module 118 is adjustable, and is set by the value of receive gain parameter 119.

Continuing with FIG. 1, adjusted receive signal 120 is passed to receive processing module 122. Receive processing module 122 processes adjusted receive signal 120, for example, by filtering the receive signal. The filtered receive signal is passed to acoustic echo canceller 124 and then to speaker 126 which reproduces the signal as sound waves for the user. Conversely, the user generates a communication signal by speaking into microphone 128, which feeds the communication signal to acoustic echo canceller 124. Acoustic echo canceller 124 includes attenuation module 130 which attenuates the user's communication signal when an acoustic echo, i.e. feedback in the form of sound waves in the air from speaker 126 to microphone 128, is detected. U.S. Pat. No. 5,999,828 entitled "Multi-user Wireless Telephone Having Dual Echo Cancellers" and assigned to the assignee of the present invention, discloses principles related to acoustic echo cancellers, and techniques for cancelling echoes in wireless communication systems. The disclosure in that patent, i.e. U.S. Pat. No. 5,999,828, is hereby fully incorporated by reference into the present application.

The user's communication signal, whether attenuated or not, is passed from acoustic echo canceller 124 to transmit processing module 132. Transmit processing module 132 processes the user's communication signal, for example, by filtering the user's communication signal, and produces transmit signal 114. As described above, transmit signal 114 is fed to network echo suppressor 116 and then to AMPS communication module 110.

Continuing with FIG. 1, network echo suppressor 116 samples receive signal 112 and also samples transmit signal 114. The samples can be stored, for example, in buffer registers included in network echo suppressor 116. In one embodiment, the samples are used to provide a coherence estimate between receive signal 112 and transmit signal 114. Coherence estimation is one of a number of mathematical techniques which can be used to provide a measure of the similarity between receive signal 112 and transmit signal 114. An alternative technique which can be used, for example, is adaptive filtering. Thus, the coherence estimate can be used to detect network echo.

The coherence estimate is used as an input parameter to state machine 134, which is included in network echo suppressor 116. Network echo suppressor 116 also receives, as input parameters, acoustic echo canceller parameters 133 from acoustic echo canceller 124, which can affect the operation of state machine 134. Acoustic echo canceller parameters 133 can include, for example, a parameter indicating whether acoustic echo canceller 124 is currently switching off the user's communication signal, also referred to as a "muting parameter", and a parameter indicating the mode of operation of acoustic echo canceller 124, also referred to as a "mode of operation parameter". The mode of operation of acoustic echo canceller 124 corresponds to the operation of mobile station 150. Mobile station 150 can be operated, for example, using a handset or a headset or as a speakerphone. Acoustic echo canceller 124 operated differently depending on the mode of operation. For example, handset mode requires the least amount of attenuation by acoustic echo canceller 124, headset mode typically requires more attenuation, and speakerphone, referred to as "hands free mode" typically requires the most amount of attenuation by acoustic echo canceller 124.

Based on its input parameters and its current state, state machine 134 adjusts the value of receive gain parameter 119 and changes its current state to its next state as more fully described below. By adjusting receive gain parameter 119 which controls the gain of gain module 118, network echo suppressor 116 can either attenuate receive signal 112 by any desired amount, including muting receive signal 112 completely, or passing receive signal 112 to receive processing module 122 unaffected. Thus, FIG. 1 illustrates an example of network echo suppression in an exemplary wireless communication system in accordance with one embodiment.

Figure 2:
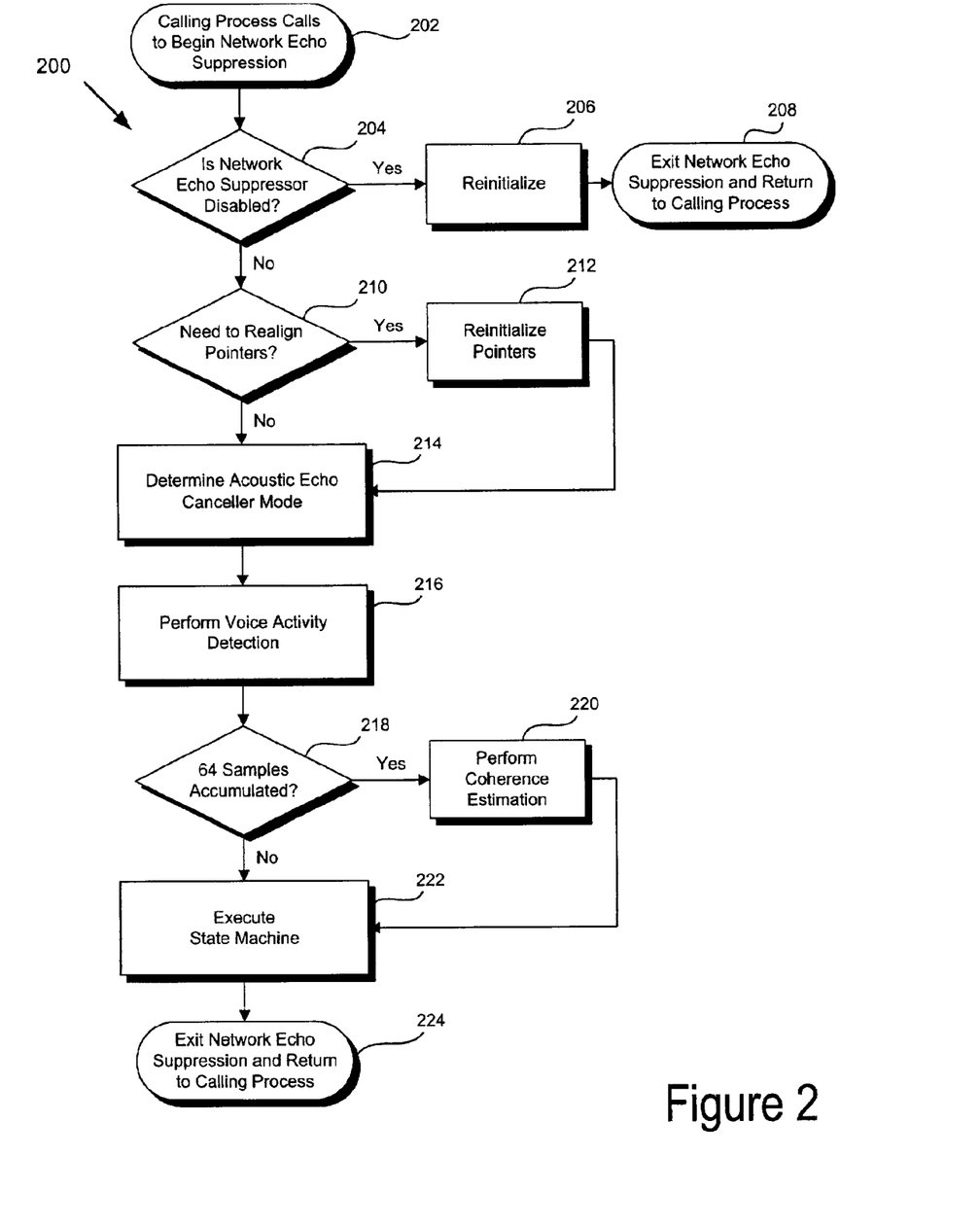
FIG. 2 is a flow chart illustrating the steps for network echo suppression in accordance with one embodiment of the present invention.

Referring now to FIG. 2, flow chart 200 describes one example of a process for network echo suppression in accordance with one embodiment. Flowchart 200 shown in FIG. 2 describes a process which can be performed in a dual-mode mobile station when communication is taking place in AMPS mode. The process shown in flowchart 200 can be performed by a mobile station, such as mobile station 150, for example, in a dual-mode AMPS and CDMA communication system or spread spectrum communication system.

Continuing with FIG. 2, at step 202 the invention's process for network echo suppression begins with a function or subroutine call from a calling process. The call can be a standard function call, for example, from a process which coordinates operation of the mobile station hardware and which is executed by the mobile station whenever it is "on". The process for network echo suppression may be called approximately once every millisecond (one one-thousandth of a second), for example.

Continuing with FIG. 2, at step 204 the network echo suppression process determines whether the network echo suppressor, for example, network echo suppressor 116 shown in FIG. 1, has been disabled. The network echo suppressor is not needed and can be disabled, for example, when the dual-mode mobile station is operated in CDMA mode. When the network echo suppression process determines that the network echo suppressor has been disabled, the process proceeds to step 206. When the network echo suppression process determines that the network echo suppressor has not been disabled, the process proceeds to step 210.

At step 206 of flowchart 200, the network echo suppressor is reinitialized. For example, network echo suppressor 116 shown in FIG. 1 can be disabled by setting the gain of gain module 118 to 0 dB, i.e. receive signals are passed through network echo suppressor 116 substantially unaffected. In order, for example, to re-enable network echo suppressor 116, the gain of gain module 118 can be reset, in step 206 of flowchart 200, to be the value of receive gain parameter 119. The network echo suppression process then proceeds to step 208, where control is returned to the calling process and the network echo suppression process is exited. The return can be a standard function or subroutine return to the calling process, for example.

At step 210 of flowchart 200, the network echo suppression process determines whether its data pointers need to be realigned. When the network echo suppression process determines that its data pointers need to be realigned, the process proceeds to step 212. When the network echo suppression process determines that its data pointers do not need to be realigned, the process proceeds to step 214.

At step 212 of flowchart 200, the network echo suppression process resets the values of pointers into buffers that are used to store the values of samples from the user's communication signal. For example, samples from transmit signal 114 and receive signal 112 can be stored, respectively, in a transmit buffer and a receive buffer. Then, for example, the values of a transmit buffer pointer and a receive buffer pointer can be adjusted so that the sample pointed to by the receive buffer pointer corresponds to the sample pointed to by the transmit buffer pointer after accounting for the roundtrip network transmission delay in propagation of the user's communication signal. In other words, the buffer pointers are time-aligned so that, in the presence of a network echo, each pointer would be pointing, respectively, to a transmit and receive signal sample at, for example, the beginning of the part of the communication which is echoed. After resetting, also referred to as "reinitializing" or "realigning", the values of the pointers, the network echo suppression process continues at step 214.

At step 214 of flowchart 200, the network echo suppression process determines the mode of the acoustic echo canceller, which can be handset mode, headset mode, or hands free mode, for example as described above. Based on the acoustic echo canceller mode the value of receive gain parameter 119 can be set differently. For example, the value of receive gain parameter 119 required for preventing howling may be 0 dB in handset mode, −6 dB in headset mode, and −18 dB in hands free mode. Thus, for example, step 214 can be used to ascertain parameter values for setting the levels of receive gain parameter 119 output by state machine 134 depending on the acoustic echo canceller mode.

At step 216 of flowchart 200, the network echo suppression process determines if there is voice activity, which can be, for example, the user speaking into microphone 128 of mobile station 150, i.e. the near end, or another person speaking from the land side or network side, using base station 102, i.e. the far end. The presence of voice activity can be determined by a number of techniques, for example, vocoder frame rate determination can be used. After determining the presence or absence of voice activity, a parameter or parameters indicating presence or absence of voice activity can be set for the use of state machine 134. For example, one parameter can be set for far end voice activity and one parameter can be set for near end voice activity.

At step 218 of flowchart 200, the network echo suppression process determines whether enough transmit and receive signal samples have been accumulated to perform a coherence estimation on the new samples. For example, samples can be accumulated from transmit signal 114 and receive signal 112, and the samples can be stored, respectively, in a transmit buffer and a receive buffer. In one embodiment, coherence estimation is performed on a block of 128 samples, and each successive block of samples is overlapped by 64 samples with the previous block. Thus, in one embodiment, step 218 determines whether 64 new samples have been accumulated before the network echo suppression process performs a new coherence estimation on a 128-sample block. When step 218 determines that 64 new samples have been accumulated, the network echo suppression process proceeds to step 220. When step 218 determines that 64 new samples have not been accumulated, the network echo suppression process proceeds to step 222.

At step 220 of flowchart 200, the network echo suppression process performs a coherence estimation on samples from the user's communication signal in order to detect network echo. For example, the coherence estimation can be performed on blocks of 128 samples each from transmit signal 114 and receive signal 112. A number of techniques can be used to detect network echo, such as adaptive filtering for example. By way of comparison, coherence estimation can provide a measure of network echo in a short amount of time as coherence estimation does not require long term adaptation as with an adaptive filter. In addition, coherence estimation can easily be "tuned" to selectively determine which frequencies, i.e. nulls in the frequency spectrum, are important to the echo detection measure based on the characteristics of the echo channel. Furthermore, coherence estimation can provide a measure of the amount of noise and interference in the correlation between the transmit and receive signals, which is more difficult to achieve with, for example, adaptive filters. The simplicity and speed of the coherence estimation technique can be critical, for example, in an environment such as that of mobile station 150 where the network echo suppression process is called approximately once every millisecond.

At step 222 of flowchart 200, the network echo suppression process executes a state machine in order to effect the complex decision making process for detecting and suppressing network echo. For example, the state machine of step 222 can evaluate several factors, such as the mode of the acoustic echo canceller, whether the acoustic echo canceller is muting acoustic feedback, the coherence estimate of network echo, whether to attenuate or mute network echo, and whether to extend attenuation or muting for a specific time interval, referred to as "hangover", to make a decision regarding what level to set the gain of the receive signal. For example, one output of state machine 134 included in network echo suppressor 116 shown in FIG. 1 is the value of receive gain parameter 119, which sets the gain applied to receive signal 112, thereby adjusting the strength of adjusted receive signal 120. An exemplary state machine for network echo detection and suppression in accordance with one embodiment is further described below in relation to FIG. 3.

At step 224 of flowchart 200, the network echo suppression process returns control to the calling process and the network echo suppression process is exited. The return can be a standard function or subroutine return to the calling process, for example. Thus, FIG. 2 describes one example of a process for detection and suppression of network echo, in accordance with one embodiment.

Figure 3:
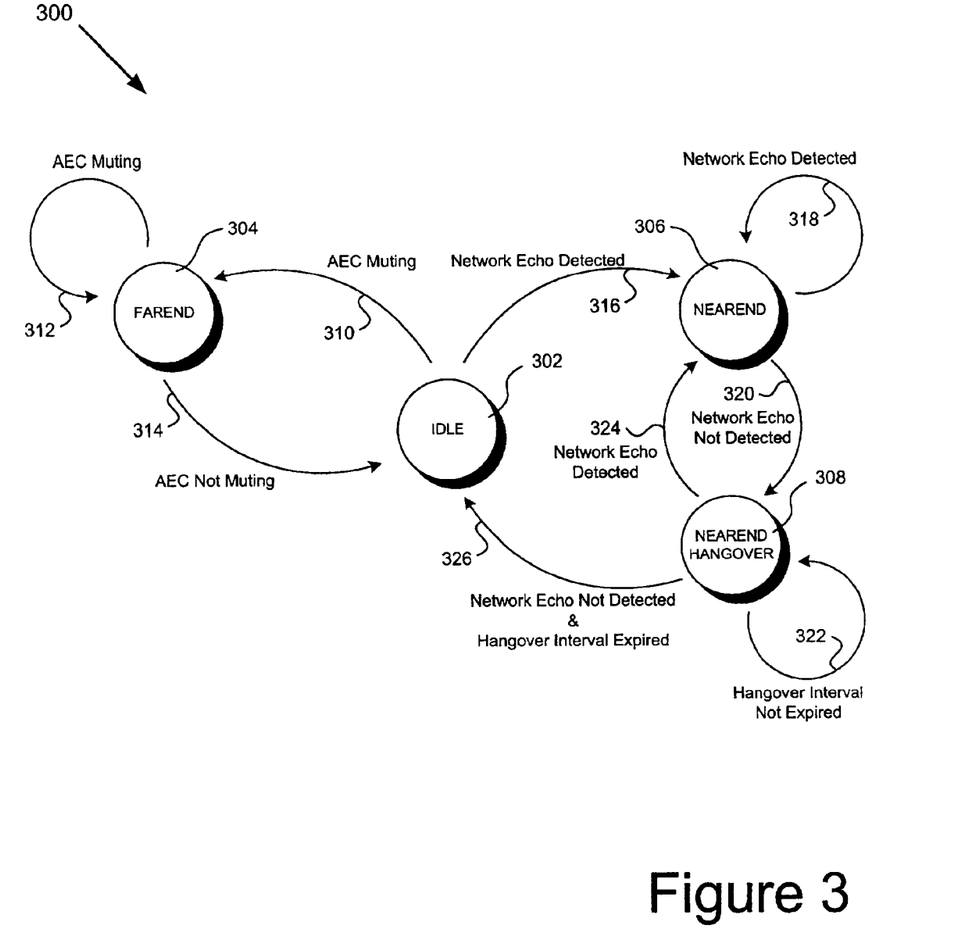
FIG. 3 is a state transition diagram illustrating an example of a state machine for network echo suppression in accordance with one embodiment of the present invention.

Referring now to FIG. 3, an exemplary state machine for network echo detection and suppression in accordance with one embodiment is described. FIG. 3 describes exemplary state machine 300 in terms of a state transition diagram describing the operation of state machine 300 for network echo suppression in accordance with one embodiment. In general a state machine operates by processing an input according to the current state of the state machine in order to determine an output and a next state, which becomes the current state of the state machine on the next execution. Thus, each time state machine 300 is executed it starts from the state in which the previous execution left it. A reset state can be provided for the initial execution of the state machine, for example, to ensure that all variables and parameters affecting execution of the state machine are correctly set at initial execution. The details of providing a reset state are apparent to a person of ordinary skill in the art, and are, therefore not discussed in the present application.

Continuing with FIG. 3, state machine 300 includes idle state 302, farend state 304, nearend state 306, and nearend hangover state 308. State machine 300 also includes state transitions 310, 312, 314, 316, 318, 320, 322, 324, and 326. At idle state 302, state machine 300 checks whether the acoustic echo canceller is muting. For example, state machine 300 can check acoustic echo canceller parameters 133 shown in FIG. 1. If the acoustic echo canceller is muting, state machine 300 follows state transition 310 and sets the value of the receive gain to 0 dB. For example, the value of receive gain parameter 119 can be set to 0 dB, i.e. unity gain, which has substantially no effect on receive signal 112. If the acoustic echo canceller is not muting, state machine 300 checks whether a network echo has been detected. For example, state machine 300 can check the coherence estimate provided by network echo suppressor 116 shown in FIG. 1. When a network echo has been detected, state machine 300 follows state transition 316 and sets the value of the receive gain to mute. For example, the value of receive gain parameter 119 can be set to negative infinity dB, i.e. zero gain, which substantially switches off receive signal 112. When a network echo has not been detected, state machine 300 performs further processing as more fully described below in connection with FIG. 4, and remains in the idle state.

At farend state 304, state machine 300 checks whether the acoustic echo canceller is muting. For example, state machine 300 can check acoustic echo canceller parameters 133 shown in FIG. 1. If the acoustic echo canceller is muting, state machine 300 follows state transition 312 and sets the value of the receive gain to 0 dB. If the acoustic echo canceller is not muting, state machine 300 follows state transition 314 to idle state 302 and sets the value of the receive gain to attenuate, for example −6 dB.

At nearend state 306, state machine 300 checks whether a network echo has been detected. For example, state machine 300 can check the coherence estimate provided by network echo suppressor 116 shown in FIG. 1. When a network echo has been detected, state machine 300 follows state transition 318 and sets the value of the receive gain to mute. When a network echo has not been detected, state machine 300 follows state transition 320 and sets the value of the receive gain to mute.

At nearend hangover state 308, state machine 300 checks whether a network echo has been detected. For example, state machine 300 can check the coherence estimate provided by network echo suppressor 116 shown in FIG. 1. When a network echo has been detected, state machine 300 follows state transition 324 and sets the value of the receive gain to mute. When a network echo has not been detected, state machine 300 checks whether the hangover interval has expired. As noted above, once a network echo has been attenuated or muted, the attenuation or muting is extended for a specific interval of time, the hangover interval, which allows, for example, a trailing echo, which may not be detected by the coherence estimation, to die away before attenuation or muting is ceased. If the hangover interval is not expired, state machine 300 follows state transition 322 and sets the value of the receive gain to mute. When a network echo has not been detected and the hangover interval is expired, state machine 300 follows state transition 326 and sets the value of the receive gain to attenuate, for example −6 dB. Thus, FIG. 3 illustrates an exemplary state machine for detection and suppression of network echo in accordance with one embodiment.

Figure 4:
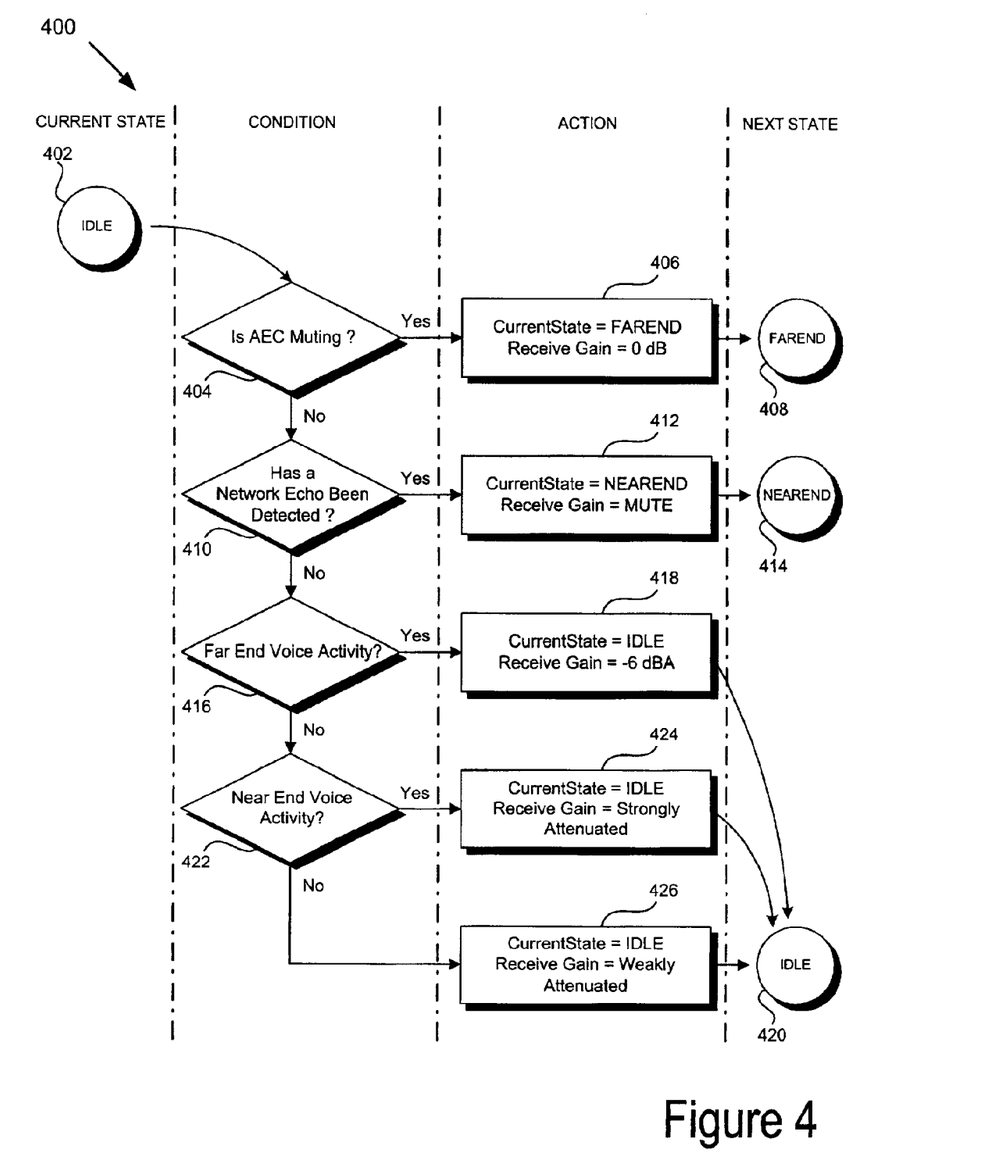
FIG. 4 is a flow chart illustrating the steps for processing state transitions from the idle state in the state machine shown in FIG. 3 for network echo suppression in accordance with one embodiment of the present invention.

Referring now to FIG. 4, flow chart 400 describes one example of a process for executing state transitions from idle state 302 in exemplary state machine 300, shown in FIG. 3, for network echo suppression in accordance with one embodiment. Flowchart 400 shown in FIG. 4 describes the process of executing state transitions from idle state 302 in exemplary state machine 300 in more detail than is shown in FIG. 3. The process begins with the current state of state machine 300 equal to idle state 402, which is identical to idle state 302 shown in FIG. 3.

At step 404 of flowchart 400, state machine 300 first checks whether the acoustic echo canceller is muting. For example, state machine 300 can check acoustic echo canceller parameters 133 shown in FIG. 1. When the acoustic echo canceller is muting, state machine 300 proceeds to step 406, and when the acoustic echo canceller is not muting, state machine 300 proceeds to step 410.

At step 406, state machine 300 sets the current state to farend, and sets the value of the receive gain to 0 dB. For example, the value of receive gain parameter 119 can be set to 0 dB, i.e. unity gain, which has substantially no effect on receive signal 112. The effect of setting the current state to farend is that state machine 300 transitions to farend state 408, which is identical to farend state 304 shown in FIG. 3. Thus, the next execution of state machine 300 will occur from farend state 304.

At step 410 of flowchart 400, state machine 300 checks whether a network echo has been detected. For example, state machine 300 can check the coherence estimate provided by network echo suppressor 116 shown in FIG. 1. When a network echo has been detected, state machine 300 proceeds to step 412, and when a network echo has not been detected, state machine 300 proceeds to step 416.

At step 412, state machine 300 sets the current state to nearend, and sets the value of the receive gain to mute. For example, the value of receive gain parameter 119 can be set to negative infinity dB, i.e. zero gain, which substantially switches off receive signal 112. The effect of setting the current state to nearend is that state machine 300 transitions to nearend state 414, which is identical to nearend state 306 shown in FIG. 3. Thus, the next execution of state machine 300 will occur from nearend state 306.

At step 416 of flowchart 400, state machine 300 checks whether there is far end voice activity. For example, state machine 300 can check the far end voice activity parameter provided by the network echo suppressor in step 216 of FIG. 2. When far end voice activity has been detected, state machine 300 proceeds to step 418, and when far end voice activity has not been detected, state machine 300 proceeds to step 422.

At step 418, state machine 300 sets the current state to idle, and sets the value of the receive gain to approximately −6 dB. For example, the value of receive gain parameter 119 can be set to approximately −6 dB, i.e. a gain which attenuates receive signal 112 but does not mute or switch off receive signal 112. By not completely muting receive signal 112, the state machine allows for more natural conversation flow, such as one speaker being able to communicate with a second speaker and be heard even though the second speaker is talking. In addition, by not completely muting receive signal 112, the state machine compensates for imperfection of coherence estimation or other technique of detecting network echo. The effect of setting the current state to idle is that state machine 300 transitions to idle state 420, which is identical to idle state 302 shown in FIG. 3. Thus, the next execution of state machine 300 will occur from idle state 302.

At step 422 of flowchart 400, state machine 300 checks whether there is near end voice activity. For example, state machine 300 can check the near end voice activity parameter provided by the network echo suppressor in step 216 of FIG. 2. When near end voice activity has been detected, state machine 300 proceeds to step 424, and when near end voice activity has not been detected, state machine 300 proceeds to step 426.

At step 424, state machine 300 sets the current state to idle, and sets the value of the receive gain to a level which depends on the acoustic echo canceller mode. For example, the value of receive gain parameter 119 can be set to approximately 0 dB for handset mode, approximately −6 dB for headset mode, and approximately −18 dB for hands free mode. The gain is set to a level which attenuates receive signal 112 but does not mute or switch off receive signal 112. By not completely muting receive signal 112, the state machine allows for more natural conversation flow, such as one speaker being able to communicate with a second speaker and be heard even though the second speaker is talking. In addition, by not completely muting receive signal 112, the state machine compensates for imperfection of coherence estimation or other technique of detecting network echo. The effect of setting the current state to idle is that state machine 300 transitions to idle state 420, which is identical to idle state 302 shown in FIG. 3. Thus, the next execution of state machine 300 will occur from idle state 302.

At step 426, state machine 300 sets the current state to idle, and sets the value of the receive gain to a level which depends on the acoustic echo canceller mode. For example, the value of receive gain parameter 119 can be set to approximately 0 dB for handset mode, approximately −3 dB for headset mode, and approximately −15 dB for hands free mode. The gain is set to a level which attenuates receive signal 112 but does not mute or switch off receive signal 112.

By not completely muting receive signal 112, the state machine allows for more natural conversation flow, such as a pause by both speakers with either speaker being able to communicate with the other speaker and be heard. In addition, by not completely muting receive signal 112, the state machine compensates for imperfection of coherence estimation or other technique of detecting network echo. The effect of setting the current state to idle is that state machine 300 transitions to idle state 420, which is identical to idle state 302 shown in FIG. 3. Thus, the next execution of state machine 300 will occur from idle state 302.

Thus, FIG. 4 illustrates one example of a process for executing state transitions from idle state 302 in exemplary state machine 300, shown in FIG. 3, for detection and suppression of network echo in accordance with one embodiment.

It is appreciated by the above description that the invention provides network echo suppression in mobile stations. According to one embodiment of the invention described above, detection and suppression of network echo is provided for a dual-mode mobile station in a wireless communication system. According to one embodiment, detection and suppression of network echo is provided by a network echo suppressor coupled to an acoustic echo canceller included in the mobile station. Therefore, interactions between network echo suppression and acoustic echo suppression can be controlled for improved communication quality. Moreover, according to an embodiment of the invention described above, the use of a low complexity coherence estimation technique improves the speed and responsiveness of network echo suppression and improves interaction between network echo suppression and acoustic echo suppression. Although the invention is described as applied to communications in a dual-mode AMPS and CDMA system, it will be readily apparent to a person of ordinary skill in the art how to apply the invention in similar situations where coordinated network echo suppression and acoustic echo suppression is needed in a wireless communication system.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a mobile station. In the alternative, the processor and the storage medium may reside as discrete components in a mobile station.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. For example, different echo detection techniques, such as adaptive filtering, can be used instead of the coherence estimation technique described in connection with one embodiment. Thus, the present invention is not intended to be limited to the embodiments shown herein but is to be accorded the widest scope consistent with the principles and novel features disclosed herein.

Thus, network echo suppression in mobile stations has been described.

What is claimed is:

1. A device comprising:
   a communication module configured to communicate with a base station in a wireless communication system;
   an acoustic echo canceller configured to detect and cancel an acoustic echo generated during a communication between said device and said base station; and
   a network echo suppressor receiving am input from said acoustic echo canceller and passing said communication to said acoustic echo canceller, said network echo suppressor attenuating a network echo generated during said communication between said device and said base station by computing a coherence estimate on a block of transmit signal samples of said communication and on a block of receive signal samples of said communication to detect the network echo, wherein each block of samples comprises samples from a previous block and new samples.

2. The device of claim 1 wherein said communication module is an AMPS communication module in a dual-mode handset providing AMPS and CDMA services.

3. The device of claim 1 wherein said acoustic echo canceller operates in at least two distinct modes of operation.

4. The device of claim 3 where said modes of operation include a hands free mode.

5. The device of claim 3 where said modes of operation include a handset mode.

6. The device of claim 3 where said modes of operation include a headset mode.

7. The device of claim 3 wherein said input from said acoustic echo canceller includes a mode of operation parameter.

8. The device of claim 1 wherein said input from said acoustic echo canceller includes a muting parameter.

9. The device of claim 1 wherein said network echo suppressor includes a state machine.

10. The device of claim 1 wherein said network echo suppressor includes a gain module.

11. A method comprising steps of:

coupling a plurality of acoustic echo canceller parameters from an acoustic echo canceller to a network echo suppressor;

determining a voice activity parameter;

computing a coherence estimate on a block of transmit signal samples and on a block of receive signal samples to detect a network echo, wherein each block of samples comprises samples from a previous block and new samples;

providing said voice activity parameter and said coherence estimate to said network echo suppressor; and attenuating said network echo with said network echo suppressor, wherein said attenuated network echo is passed to said acoustic echo canceller.

12. The method of claim 11 wherein said coupling step comprises setting said plurality of said acoustic echo canceller parameters, and said network echo suppressor reading said plurality of said acoustic echo canceller parameters.

13. The method of claim 11 wherein said determining step comprises using vocoder frame rate determination.

14. The method of claim 11 wherein said computing step comprises computing a coherence estimate on a block of samples, wherein said block of samples comprises said transmit signal samples and said receive signal samples.

15. The method of claim 14 wherein said block of samples comprises 128 samples wherein 64 samples of said 128 samples are new samples.

16. The method of claim 11 wherein said providing step comprises setting said voice activity parameter and said coherence estimate and said network echo suppressor reading said voice activity parameter and said coherence estimate.

17. The method of claim 11 wherein said providing step comprises providing said voice activity parameter and said coherence estimate to a state machine.

18. The method of claim 11 wherein said attenuating step comprises executing a state machine.

19. The method of claim 11 wherein said attenuating step comprises setting a receive gain parameter.

20. The method of claim 11 wherein said attenuating step comprises using a gain module to attenuate a receive signal, said gain module attenuating said receive signal according to a value of a receive gain parameter.

21. A method for communicating between a base station and a mobile station, said method comprising steps of:

determining a voice activity parameter of said communication; computing a coherence estimate on a block of transmit signal samples of said communication and on a block of receive signal samples of said communication to detect a network echo, wherein each block of samples comprises samples from a previous block and new samples;

ascertaining a plurality of acoustic echo canceller parameters from an acoustic echo canceller;

providing said voice activity parameter, said coherence estimate, and said plurality of acoustic echo canceller parameters to a network echo suppressor; and attenuating said network echo with said network echo suppressor, wherein said attenuated network echo is passed to said acoustic echo canceller.

22. The method of claim 21 wherein said network echo suppressor is used in a dual-mode handset providing AMPS and CDMA services.

23. The method of claim 21 wherein said determining step comprises using vocoder frame rate determination.

24. The method of claim 21 wherein said computing step comprises computing a coherence estimate on a block of samples, wherein said block of samples comprises said transmit signal samples and said receive signal samples.

25. The method of claim 24 wherein said block of samples comprises 128 samples wherein 64 samples of said 128 samples are new samples.

26. The method of claim 21 wherein said ascertaining step comprises setting said plurality of said acoustic echo canceller parameters, and said network echo suppressor reading said plurality of said acoustic echo canceller parameters.

27. The method of claim 26 wherein said plurality of said acoustic echo canceller parameters includes a muting parameter and a mode of operation parameter.

28. The method of claim 21 wherein said providing step comprises providing said voice activity parameter and said coherence estimate and said plurality of acoustic echo canceller parameters to a state machine.

29. The method of claim 21 wherein said attenuating step comprises executing a state machine.

30. The method of claim 21 wherein said attenuating step comprises executing a state machine, said state machine setting a receive gain parameter, and using a gain module to attenuate a receive signal, said gain module attenuating said receive signal according to said receive gain parameter.

* * * * *